No. 696,316. Patented Mar. 25, 1902.
W. S. CORBIN.
PIPE OR MAIN.
(Application filed Aug. 9, 1901.)
(No Model.)
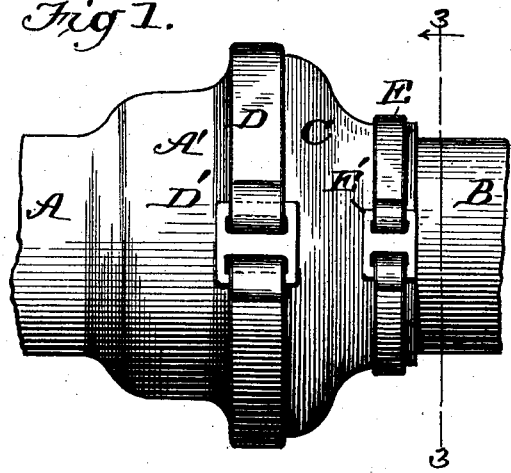
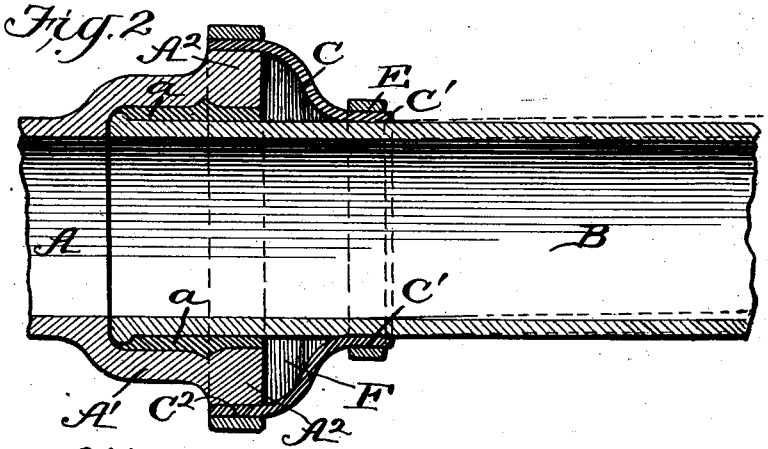
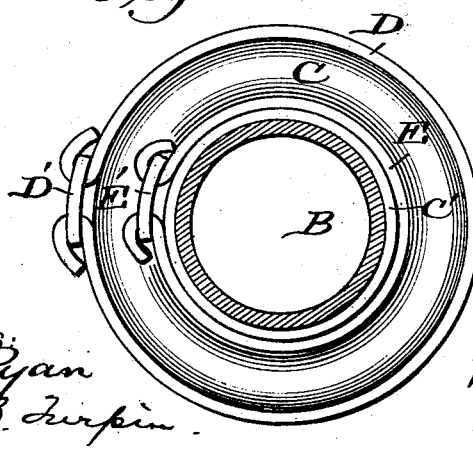
WITNESSES:
Jos. A. Ryan
Perry B. Turpin
INVENTOR
William S. Corbin
BY Munn & Co.
ATTORNEYS
THE NORRIS PETERS CO., PHOTO-LITHO., WASHINGTON, D. C.

UNITED STATES PATENT OFFICE.

WILLIAM S. CORBIN, OF JOHNSTOWN, NEW YORK.

PIPE OR MAIN.

SPECIFICATION forming part of Letters Patent No. 696,316, dated March 25, 1902.

Application filed August 9, 1901. Serial No. 71,485. (No model.)

*To all whom it may concern:*

Be it known that I, WILLIAM S. CORBIN, a citizen of the United States, residing at Johnstown, in the county of Fulton and State of New York, have made certain new and useful Improvements in Pipes or Mains, of which the following is a specification.

My invention is an improvement in pipes and mains having for an object to provide a novel construction whereby to form a cover for the joint between pipe-sections to prevent leakage, which cover will seal the joints whether the joints be permitted to remain in the original position or are forced out of such position either by dropping or by being raised at the joints by any upheaval that may occur below the same; and the invention consists in certain novel constructions and combinations of parts, as will be hereinafter described and claimed.

In the drawings, Figure 1 is a side view, and Fig. 2 a longitudinal section, of my improved joint; and Fig. 3 is a cross-sectional view on about line 3 3 of Fig. 1.

In the construction shown the pipe-sections A and B are of the form commonly used, the section A having at its end the bell or socket A' to receive the end of the section B and such socket or bell being provided at its outer end with the outwardly-projecting annular bead or flange $A^2$. The bell A' is packed at $a$ with lead or other suitable packing surrounding the extremity of the section B. Now it is well known that leaks frequently occur in mains at the joints from various causes. Sometimes these leaks occur from imperfect packing at $a$. At other times the joint is displaced by dropping or by upheavals below the joint, as will be understood from dotted lines in Fig. 2, and leaks also occur by reason of the expansion of the mains and their subsequent contraction, which leaves the packing $a$ imperfect. By my invention I seek to provide a novel construction of joint which can be readily adopted in laying the mains, as well as in mains already in the ground. In doing this I aim to provide for the longitudinal expansion of the mains, as well as any slight bending of the joints, without rendering the sealing-cover ineffective. In thus carrying out my invention I employ a sealing-jacket C of ductile metal, preferably lead, which sealing-jacket is in the form of a bell, with its sides formed on lines simulating the line of beauty or compound curve. By this means the jacket is adapted to be secured at its large end upon the bell of the section A and to curve thence inwardly and fit at its smaller end upon the section B. Now if the large end of the jacket C be secured upon the bell and its smaller end be secured upon the section B by devices which securely clamp the opposite ends of the jacket it will be noticed, as shown in Fig. 2, that the jacket will span the joint between the sections of the main and will seal the joint. Moreover, as will be understood from Fig. 2, the form of the jacket and its arrangement to flare or enlarge toward its juncture with the bell $A^2$ permit the said jacket to yield in the direction of the main and also to bend with any slight bending of the sections at their joints in such manner as to avoid any injury to the jacket or any loosening thereof at its clamp connections with the bell $A^2$ and the section B of the main.

It will be noticed that my invention can be readily applied to joints of mains in laying the same and can also be readily applied to mains already in the ground wherever a leak is found. I am thus able to apply my invention to the ordinary construction of main and in such application find it necessary to use but a minimum amount of material in producing my ductile sealing-jacket and at the same time form such jacket with the end portions at C' and $C^2$ extending on practically parallel lines, so they will lap flatwise against the section B and the portion $A^2$ of the bell in the application of the jacket, as before described.

In securing the jacket in place I prefer to employ clamping devices of the form shown and consisting of straps D and E, united at their ends by buckles D' and E', the said straps being arranged to extend circumferentially around the sealing-jacket at the ends thereof and to bind the said sealing-jacket securely and firmly to and against the bell and the section B at the points shown in Fig. 2 in such manner as to press the jacket into sealing contact with the portions around which it is fitted.

It will be noticed that by the form of jacket shown I provide a space at F between the joint proper, *a*, and the jacket, and it may be desirable in some instances to utilize this space for the reception of supplemental packing material, such as clay; but I do not desire to be restricted in the broad features of my invention to any such supplemental packing material.

In the application of my invention the large end of the flared sealing-jacket is fitted upon the outwardly-projecting bead at the mouth of the bell on section A, and the smaller end of the sealing-jacket is fitted around the section B of the main, and the clamping parts D and E are applied and secured to clamp the jacket at its opposite ends.

The invention is simple, easily adjusted for use, and efficiently serves the purpose of guarding the joints against leakage, as before described.

Having thus described my invention, what I claim, and desire to secure by Letters Patent, is—

1. The combination of the pipe-sections fitted together, and one of the sections having a bell or socket at one end fitting over the end of the other section, the ductile metallic sealing-jacket, made in the form of a bell with its sides curved on compound curves and with its larger end fitting upon the outer side of the mouth of the bell of the pipe-section, and its smaller end fitting upon the pipe-section fitting in said bell, and the clamping-bands fitting around the sealing-jacket at the ends thereof and clamping said ends into sealing contact with the parts which they embrace, substantially as set forth.

2. The combination of the pipe-sections, one of which is formed with a bell, and the end of the other section being fitted in said bell, and the ductile metallic sealing-jacket made larger at one end than at the other and fitting at its large end upon the mouth of the bell and at its small end upon the pipe-section fitting in said bell, and clamping devices by which the ends of the jacket are secured in sealing contact upon the parts which they embrace, substantially as set forth.

3. The pipe-section provided at its end with a bell and having an outwardly-projecting bead or portion at the mouth of said bell, the pipe-section fitting at its end in the bell, and the ductile metallic sealing-jacket secured at one end upon the outwardly-projecting bead of the bell, reduced in diameter toward its opposite end and secured at such end upon the pipe-section which fits within the bell, substantially as set forth.

4. The pipe-sections, one of which has a bell fitting around the end of the other section, combined with a ductile metallic sealing-jacket made larger at one end than at the other, means securing the large end of the jacket in sealing contact with the bell of one of the pipe-sections, and means for securing the smaller end of the sealing-jacket in sealing contact with the pipe-section which fits within the bell, substantially as set forth.

5. As an improvement in pipes and mains the section A having at one end a socket to receive the section B, the section B fitting in one end in said socket, the packing *a* for the joint between the said sections A and B, the bell-shape sealing-jacket of ductile material having its larger end fitting upon the socketed end of the section A and its smaller end fitting upon the section B, and the clamping-bands fitting around the sealing-jacket at its opposite ends, all substantially as described whereby in case of any displacement or injury to the seal *a* the ductile jacket will prevent leakage at the joint so injured substantially as set forth.

WILLIAM S. CORBIN.

Witnesses:
SOLON C. KEMON,
PERRY B. TURPIN.